US006943929B2

(12) United States Patent
    Faris

(10) Patent No.: US 6,943,929 B2
(45) Date of Patent: Sep. 13, 2005

(54) OPTICAL TRANSISTOR

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 10/756,844

(22) Filed: Jan. 13, 2004

(65) Prior Publication Data

US 2004/0201876 A1 Oct. 14, 2004

Related U.S. Application Data

(60) Provisional application No. 60/439,786, filed on Jan. 13, 2003.

(51) Int. Cl.$^7$ .............................. G02F 1/03; G02F 1/07
(52) U.S. Cl. ...................................... 359/244; 359/245
(58) Field of Search ................... 359/244, 245, 359/333; 438/22, 24, 27, 30, 31; 257/21; 372/12

(56) References Cited

U.S. PATENT DOCUMENTS 4,382,660 A * 5/1983 Pratt et al. ................. 359/244

FOREIGN PATENT DOCUMENTS

JP           02017680 A  *  1/1990  ........... H01L/31/14

* cited by examiner

Primary Examiner—Scott J. Sugarman
Assistant Examiner—Richard Hanig
(74) Attorney, Agent, or Firm—Bosco Kim; Ralph J Crispino

(57) ABSTRACT

An optical transistor is disclosed. The optical transistor consists of a high speed photodetector region incident to a light intensity modulating region which separates a drain and source region. The disclosed optical transistor is able to exhibit high speed performance with good signal isolation and high amplification gain.

16 Claims, 3 Drawing Sheets

OPTICAL TRANSISTOR

CROSS-REFERENCE TO RELATED APPLICATIONS

This application claims the benefit under 35 U.S.C. §119 (e) of U.S. Provisional Application No. 60/439,786 filed on Jan. 13, 2003 entitled "Optical Transistor," which is herein incorporated by reference.

TECHNICAL FIELD

The invention relates to optical transistors and, more particularly to optical transistors readily capable of being configured in an array.

BACKGROUND ART

An electronic transistor is the basic building block of today's computer logic circuits. Transistors use an electric current or field voltage to amplify another electric current or field voltage, creating electronic pulses that can represent the ones and zeros of binary computing. In the optical realm, transistors can function beyond optical logic operations in optical chips or optical computing, into areas of telecommunication networks. Optical transistor technology could be utilized for optic fiber communication, optical switching and routing, and wavelength conversion.

Telecommunication networks have expanded considerably over the last several decades. Although most calls, whether carrying voice (telephone calls) or data, have long used standard telephone lines, which have a low bit rate, the formidable expansion of the Internet and all other data networks, whether in the public or private sector, since the middle eighties has led to an enormous demand for bandwidth. To face up to this exponential increase in the quantity of information to be transported, and which relates to all types of media, i.e. as much to voice as to data, such as electronic mail (E-mail), text and picture file transfer, video distribution and, most importantly, the massive use of the Internet and the World Wide Web (WWW), new technologies have had to be developed, as transmission over electrical media (metal lines, copper) has proved to be too limited in performance over long distances.

At least insofar as the core of these networks is concerned, transmission is now mostly via optical fibers at very high bit rates. The rate of exchange of data, or information bits, is routinely measured in gigabits per second. This means that one billion bits can be exchanged every second over a 1 Gbit/s line. In practice, international standards exist to standardize transmission and to ensure the interworking of equipment. The most widespread of these standards is the SONET (Synchronous Optical NETwork) standard. The SONET standard is primarily a North American standard, and its European counterpart is the SDH (Synchronous Digital Hierarchy) standard. These standards are for the most part mutually compatible and standardize transmission speeds of 2.48 Gbit/s (SONET OC-48), 10 Gbit/s (SONET OC-192) and 40 Gbit/s (SONET OC-768).

Although communication equipment now communicates via a network of optical fibers, which can be very extensive and cover a city or a country, and can include intercontinental transmission, and carries pulses of light generally obtained from a coherent light emitter (laser), it remains the case that the communication equipment itself is still essentially based on electrical technologies and the peripheral circuits that constitute the equipment must be capable of being interfaced efficiently and at low cost to the devices sending and receiving light signals interfaced to the optical fibers.

In its simplest form, binary signals conveying the information bits referred to above are simply transmitted by modulating at two levels the light emitter, usually a laser. Thus the optical signal is generated at two power levels and the laser is switched from a level at which it emits a sufficient quantity of light to be received by the optical receiver situated at the other end of the fiber to a level at which it does not emit any or much light, in which state it must be considered to be turned off. The receiver is thus in a position to discriminate the two levels corresponding to an information bit (a '1' generally corresponding to the state in which the laser is emitting light, although the opposite convention is obviously equally feasible). If the emitter continues to emit between two consecutive '1' and returns to the off state only to transmit a '0', the modulation mode is known as non return to zero (NRZ) modulation. It is cheap and well suited to the mode of operation of lasers, which are turned on or off to transmit each bit of information.

It is extremely difficult, however, to create transistors with light beams. There exist several approaches to develop optical transistors, most of which are based on nonlinear optical effects or local plasma effects. Even through these approaches offer very fast operation, they have not been widely applied because special materials and very high light energies are required.

Most of efforts on developing optical transistors are concentrated on utilizing nonlinear optical effects or local plasmon effects. For example, one of invented optical transistor is based on cross-phase-modulation (XPM) induced polarization change from the third-order nonlinear susceptibility $\chi^3$ in optical materials. Another research performed by a Japanese group utilizes local plasmon, which are waves of electrons on the surface of a metal, store energy. Even though they can offer extremely fast speed to perform optical logic operation or signal amplification, these technologies have not been widely applied. One of the major reasons is limited material choice such as high nonlinear optical materials. Another drawback is high threshold, which severely restricts application areas. Moreover, many existing optical transistor technologies do not have flexibility, which can be used for many purposes. Furthermore, it is difficult for some of them to be integrated into current manufacture processes. Finally, some technologies cannot be used to build optical transistor arrays.

Therefore, a need exists for an improved optical transistor technology capable of overcoming the aforementioned limitations.

SUMMARY OF THE INVENTION

The above-discussed and other problems and deficiencies of the prior art are overcome or alleviated, and the objects of the invention are attained, by the several methods and apparatus of the present invention.

In one aspect, the invention is an optical transistor fabricated on a substrate comprising: a first terminal region disposed on one surface of said substrate; a second terminal region disposed on other surface of said substrate; a light intensity modulator region separating said first terminal region and said second terminal region; and a photo conductor region incident to said light intensity modulator region for controlling said light intensity modulator region.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, wherein.

DETAILED DESCRIPTION OF THE DRAWINGS

An optical transistor and method which has a simple structure and high performance is disclosed. The disclosed optical transistor allows for simple configuration so that ease of manufacturability is achieved. The disclosed optical transistor additionally features a small size so that high density transistor arrays are realizable. The disclosed optical transistor is a compact logical operator and can feature in a relative small size all logical operations. The optical transistor can exhibit high gain amplification with the use of a suitable light intensity modulator. The optical transistor has a low light intensity threshold, allowing for faster and more robust signal response and signal isolation. The disclosed optical transistor additionally features excellent reliability and low cost.

The disclosed optical transistor has all of the same attributes that the electronic transistor had that allowed electronics to follow "Moore's Law" performance improvements over the past decades. It has the potential to create the equivalent of "Moore's Law" effect for optical computing with similar cycles of size reductions and speed increases over the coming decades.

Figure 1A:
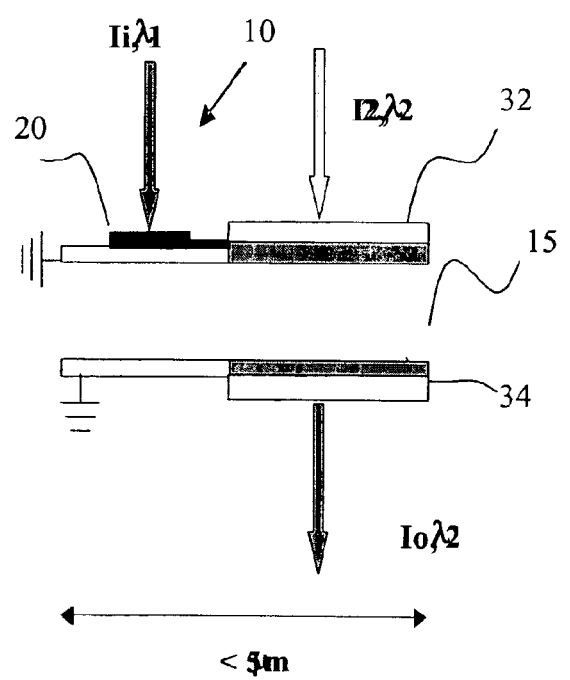
FIG. 1(a) is a schematic cross-section diagram of an optical transistor in accordance with the principles of the invention.

Referring to FIG. 1(a), there is shown the optical transistor 10 of the present invention. Two laser beams with different (or same) wavelengths are used. It will be understood that, for purposes of this disclosure, laser beams may be optical beams, light signals, waveguides or optical fibers. The incident control light Ii with a wavelength λ1 is focused on a high speed photo-conductor 20. A source light I2 with a wavelength λ2 is focused on a light intensity modulator 15. The light intensity modulator 15 includes a first terminal 32 and a second terminal 34.

It will be understood that the first terminal 32 may be a portion of the light intensity modulator 15 (e.g., a band filter or optically transparent region) or a separate component. As a separate component, the first terminal 32 may include a photodetector, a photo conductor or a appropriate type of light detector which can sense the intensity, wavelength or the polarization of the light I2.

It will also be understood that the first terminal 32 may be considered an input terminal, as an analogue to a conventional electronic transistor. In a certain embodiments, the first terminal 32 resides at the surface portion of a wafer or substrate (not shown).

The photo-conductor 20 is actuatable by the presence or absence of energy on the incident control light Ii. The electric signal from the photo-conductor 20 controls the electric field applied to a high-speed optical light intensity modulator 15. The light intensity modulator 15 modulates the intensity of signal light from the light source according to non return to zero data that is transmission data prior to output. With different electric field strengths, the optical transmission properties of the modulator 15 are changed.

The light intensity Io of the output signal light is a function of the light intensity Ii of the incident control light, as shown in FIG. 1(a). The light intensity Io with a wavelength λo emanates from a second terminal 34.

It will be understood that the second terminal 34 be a portion of the light intensity modulator 15 (e.g., a band filter or optically transparent region). As a separate component, the second terminal 34 may include a photoemitter, a laser diode, or an appropriate type of light source which can emit light or optical energy at a specified intensity, wavelength or the polarization of the light Io.

It will also be understood that the second terminal 34 may be considered an output terminal, as an analogue to a conventional electronic transistor. In a preferred embodiment, the second terminal 34 resides at the surface portion of a wafer or substrate, opposite the surface of the first terminal (not shown).

The wavelength λo of the light intensity Io is the same as the wavelength of the light intensity I2, namely λ2. This results in the device operating as an optical transistor. The total size of a single transistor can be less than 5 μm, which allows for the creation of a very high channel density optical transistor array.

More detail regarding the light intensity modulator is described. The light intensity modulator is configured for specific wavelength bands. The light intensity modulator has a multi-quantum-well absorption layer. The multi-quantum-well absorption layer comprises a plurality of well and barrier layers, which are stacked alternately in the vertical direction. The well layer can be formed from, for example, an InGaAsP layer or an InGaAs layer. The barrier layer can be formed from an InGaAsP layer, InAlAs layer, or InGaAlAs layer. In the present embodiment, the multi-quantum-well absorption layer is a multilayer film consisting of a well layer having an InGaAsP layer, and a barrier layer having an InGaAsP layer; or a multilayer film consisting of a well layer having an InGaAs layer, and a barrier layer having an InAlAs layer.

A p-InP clad layer which has been controlled so as to become a p-type semiconductor is formed on the multi-quantum-well absorption layer. A p-InGaAs contact layer of a p-type semiconductor is formed on the p-In clad layer. Further, an n-InP substrate of an n-type semiconductor is formed below the multi-quantum-well absorption layer. Between the p-In clad layer and the n-InP substrate, there are formed a semi-insulated InP current block layer, an n-InP current block layer of an n-type semiconductor, and a semi-insulated current block layer, so as to cover the side of the multi-quantum-well absorption layer.

Figure 1B:
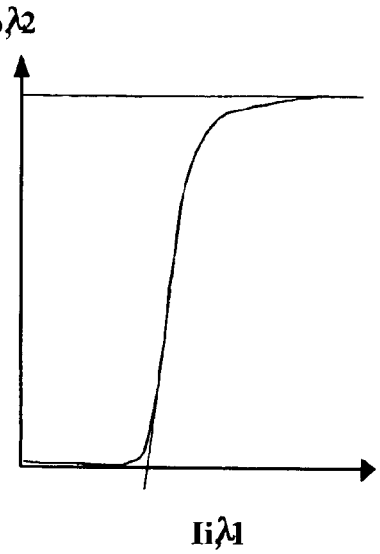
FIG. 1(b) is a graph of the performance of the optical transistor in accordance with the principles of the invention.

The operation of the optical transistor of the invention is illustrated below. If the intensity I2>>Ii, a large gain can be realized and the 'transistor' can be used for optical signal amplification. The signal amplification is illustrated in a graph showing the relationship between Ii and I2 in FIG. 1(b). The gain of this transistor is very easily adjusted by simply changing the light intensity of $I_2$. Similarly, we can realize a negative gain in this transistor when the $I_2$<Ii.

Figure 2:
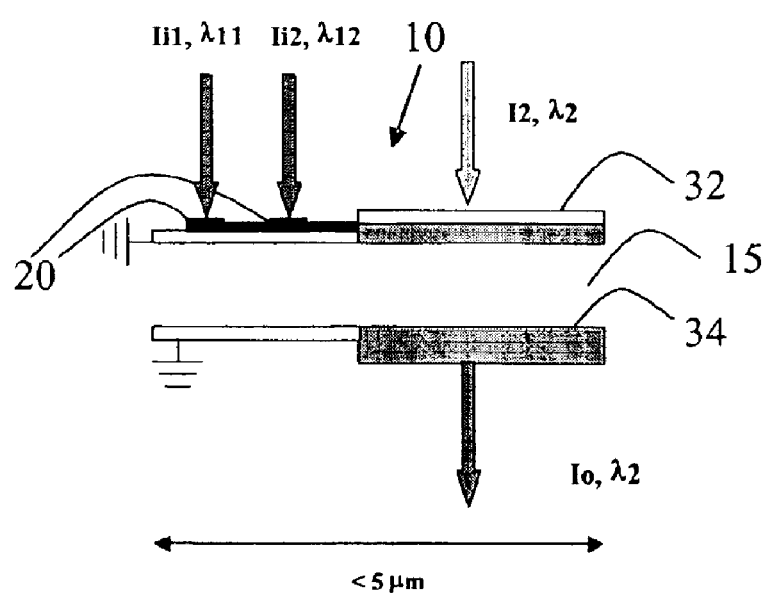
FIG. 2 is a schematic cross-section diagram of an optical transistor in accordance with the principles of the invention; and selectively bonded multi layer substrate in accordance with the principles of the invention.

If λ1=λ2, this transistor can serve as an optical logic operator to realize all of the basic logic operations such as NOT, OR, AND, NOR, NAND, XOR and XNOR. With two (or more) high-speed photo-conductors 20 associated with each device, as shown in FIG. 2, multi-bit logical operations can be easily performed.

If λ1≠λ2, this transistor can work as a wavelength converter for optical communications or other optical processors.

In alternative embodiments, the optical light intensity modulators can be any kind of high-speed modulator such as a liquid crystal modulator, optical crystal modulator or even high-speed optical polymer based modulator. If the modulator is bi-stable (i.e. either in the light transmissive or the light blocking state), then the incident control light can be pulsed to switch states and then turned off and the optical transistor will retain it's current state with no further input.

Figure 3:
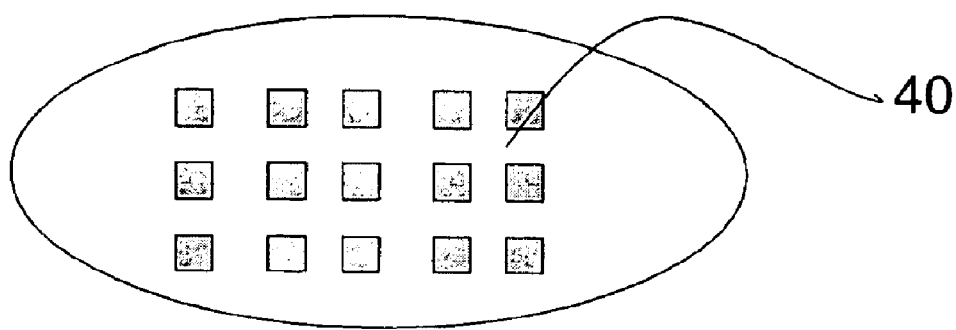
FIG. 3 is a schematic cross-section diagram of a multi-transistor array of optical transistors in accordance with the principles of the invention.
Figure 4:
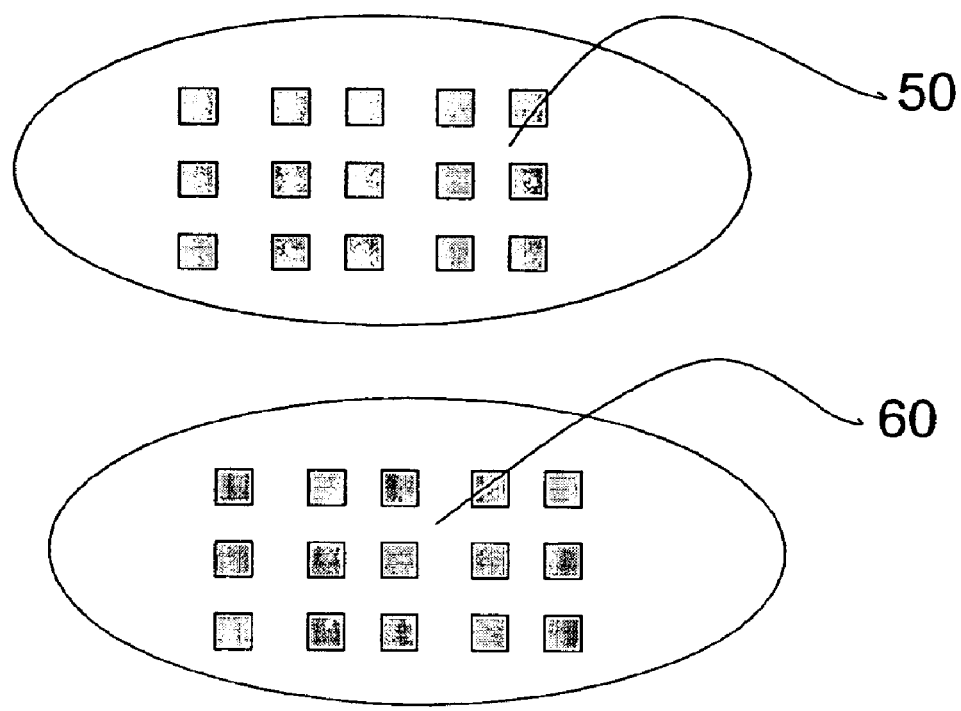
FIG. 4. shows an arrangement of two multitransistor arrays.

Referring to FIG. 4, there is shown an optical transistor of the invention arranged in a multitransistor array. FIG. 3 shows a mutitransistor arrays 40 fabricated on a wafer. Array 40 may be used in conjunction with various optical systems including, but not limited to, optical crossbars, optical waveguides, displays, or other optical systems.

Referring to FIG. 4, there is shown an optical transistor of the invention arranged in a multitransistor array. FIG. 4 shows two mutitransistor arrays 50, 60 built on wafers stacked so that light energy is incident from one terminal region of one transistor array 50 to a second terminal region of another transistor array 60. It will be understood that any number of transistor arrays may be aligned and stacked vertically or horizontally to create a three-dimensional array.

Like the conventional electronic transistor, the size and performance of the first generation optical transistor can and will be rapidly advanced with developments of manufacturing processes and materials technology. The goal of submicron size and nanosecond switching speeds can be reached in the future.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An optical transistor comprising:
   a light intensity modulator region; and
   a first photo conductor region and a second photo conductor region operably coupled to said light intensity modulator region for controlling said light intensity modulator region.

2. The optical transistor or claim 1, wherein said light intensity modulator region is formed on a substrate and is separated by a first terminal disposed on one surface of said substrate and a second terminal disposed on other surface of said substrate. wherein 3. The optical transistor of claim 1 wherein said light intensity modulator region is bi-stable.

4. The optical transistor of claim 1 wherein said light intensity modulator region is liquid crystal.

5. The optical transistor of claim 1 wherein said light intensity modulator region is optical crystal.

6. The optical transistor of claim 1 wherein said light intensity modulator region exhibits high gain.

7. The optical transistor of claim 1 wherein said light intensity modulator region exhibits negative gain.

8. The optical transistor of claim 1 wherein said light intensity modulator region is configured for specified wavelength bands.

9. The optical transistor of claim 1, further comprising:
   a control light incident on one of said first photo conductor region or said second photo conductor region.

10. The optical transistor of claim 1 wherein said photo conductor regions comprise input logic operators.

11. The optical transistor of claim 10 wherein said second terminal comprise output logic operators.

12. An array of a plurality of optical transistors of claim 1.

13. An array of a plurality of optical transistors of claim 2 comprising:
   a first array of said optical transistors; and
   a second array of said optical transistors with a plurality of first terminals disposed incident to a plurality of second terminals of light intensity modulator regions of said first array.

14. The optical transistor of claim 1, further comprising:
   a first control light incident on said first photo conductor region, a second control light incident on said second photo conductor region, and an input light incident on said light intensity modulator region.

15. The optical transistor of claim 14, further comprising:
   an output light emanating from said light intensity modulator region.

16. An array of a plurality of optical transistors comprising:
   a first array of optical transistors; and
   a second array of optical transistors,
   wherein said optical transistors include
      a light intensity modulator region; and
      a photo conductor region operably coupled to said light intensity modulator region for controlling said light intensity modulator region.

* * * * *